(12) United States Patent
Silliman et al.

(10) Patent No.: US 7,474,022 B2
(45) Date of Patent: Jan. 6, 2009

(54) LIQUID-COOLED ARMATURE BAR CLIP-TO-STRAND CONNECTION AND METHOD

(75) Inventors: George R. Silliman, Rensselaer, NY (US); Joseph Alan Worden, Clifton Park, NY (US); David Robert Schumacher, Scotia, NY (US); Jeffrey Michael Breznak, Waterford, NY (US); Alan Michael Iversen, Clifton Park, NY (US); Lawrence Lee Sowers, Balston Lake, NY (US)

(73) Assignee: General Electric Company, Schenectady, NY (US)

( * ) Notice: Subject to any disclaimer, the term of this patent is extended or adjusted under 35 U.S.C. 154(b) by 562 days.

(21) Appl. No.: 11/235,219

(22) Filed: Sep. 27, 2005

(65) Prior Publication Data

US 2007/0068998 A1    Mar. 29, 2007

(51) Int. Cl.
H02K 9/20 (2006.01)
B23K 35/12 (2006.01)

(52) U.S. Cl. .................. 310/54; 228/179.1; 228/245

(58) Field of Classification Search .............. 310/52, 310/54, 201, 260, 270; 228/179.1, 245, 246; 219/615
See application file for complete search history.

(56) References Cited

U.S. PATENT DOCUMENTS

| 3,614,493 | A | 10/1971 | Collings |
| 3,693,036 | A | 9/1972 | Schmitt |
| 5,573,414 | A | 11/1996 | Taillon et al. |
| 5,796,189 | A * | 8/1998 | Manning et al. ............. 310/54 |
| 6,784,573 | B1 * | 8/2004 | Iversen et al. ............... 310/52 |
| 7,199,338 | B2 * | 4/2007 | Breznak et al. ............. 219/615 |
| 7,202,579 | B2 * | 4/2007 | Kim et al. .................... 310/59 |
| 7,216,796 | B2 * | 5/2007 | Breznak et al. ............. 228/245 |
| 7,219,827 | B2 * | 5/2007 | Breznak et al. ............. 228/245 |
| 7,405,379 | B2 * | 7/2008 | Breznak et al. ............. 219/615 |
| 7,414,226 | B2 * | 8/2008 | Wang et al. .................. 219/615 |

OTHER PUBLICATIONS

U.S. Appl. No. 10/991,371, filed Nov. 19, 2004.
U.S. Appl. No. 10/991,416, filed Nov. 19, 2004.
U.S. Appl. No. 10/991,501, filed Nov. 19, 2004.
U.S. Appl. No. 10/841,964, filed May 10, 2004.

* cited by examiner

Primary Examiner—Tran N Nguyen
(74) Attorney, Agent, or Firm—Nixon & Vanderhye PC

(57) ABSTRACT

A liquid-cooled armature bar end fitting-to-strand brazed connection. The end fitting is comprised of a main body and a cover, and defines a cavity, a bottom wall of which is defined in part by the cover. An armature winding bar strand package including solid strands and hollow strands arranged in a tiered array extends into the end fitting so that at least the free ends of the hollow strands extend beyond the bottom wall, into the cavity. The side wall of the cavity is spaced from the hollow strands. A braze alloy joins the strands to each other and to the end fitting. The braze alloy forms an isolation layer over the free ends of the solid strands and over the said bottom wall of the cavity to a depth above a horizontal junction between the main body and the cover.

11 Claims, 8 Drawing Sheets

LIQUID-COOLED ARMATURE BAR CLIP-TO-STRAND CONNECTION AND METHOD

RELATED APPLICATIONS

This application is related to commonly owned U.S. patent application Ser. No. 10/841,964, filed May 10, 2004, entitled "CREVICE CORROSION-RESISTANT LIQUID-COOLED ARMATURE BAR CLIP-TO-STRAND CONNECTION AND RELATED METHOD", and U.S. patent application Ser. No. 10/991,371, filed Nov. 19, 2004, entitled "BRAZE END ISOLATION LAYER FOR GENERATOR ARMATURE WINDING BAR AND METHOD FOR APPLYING THE ISOLATION LAYER". These two applications are incorporated herein by reference.

BACKGROUND OF THE INVENTION

This invention relates generally to liquid-cooled armature bar clip-to-strand connections and more particularly, to a clip configuration and braising method for braising generator armature winding bars to hydraulic header clips.

The armature windings on large steam-turbine generators are generally water-cooled. The armature windings comprise an arrangement of half coils or armature bars (collectively referred to as "armature bars" or "bars") connected at each end through copper or stainless steel fittings and water-cooled connections to form continuous hydraulic winding circuits.

Water-cooled armature winding bars are comprised of a plurality of small rectangular solid and hollow copper strands arranged to form a bar. The rectangular copper strands are generally arranged in rectangular bundles. The hollow strands each have an internal duct for conducting coolant through the bar. The ends of the strands are each brazed to a respective hydraulic header clip. The hydraulic header clip serves as both an electrical and a cooling flow connection for the armature winding bar.

The hydraulic header clip is a hollow connector that includes an enclosed chamber for ingress or egress of a cooling liquid, typically deionized water. At one open end, the clip encloses the ends of the copper strands of the armature winding bar. A braze alloy bonds the end sections of the strands to each other and to the hydraulic header clip. The braze joints between adjacent strand ends and between the strand ends and the clip should retain hydraulic and electrical integrity for the expected lifetime of the winding. A typical life time of a winding is on the order of tens of years.

Internal surfaces of the brazed joints between the clip and the ends of the strands are constantly exposed to the deionized, oxygenated water flowing through the clip and the hollow strands. The exposure of the brazed surfaces to the coolant can result in corrosion of the armature winding bar and hydraulic header clip. Corrosion tends to occur in the crevices of the joints between the hydraulic header clip and the strand ends of the armature bar, and in the crevices between the strand ends. Corrosion of a phosphorous-containing braze alloy and adjoining copper strand surfaces can occur if critical crevice geometry and crevice water chemistry conditions are present. If allowed to progress through a joint, corrosion will eventually result in a water leak through the entire effective braze joint length and compromise the hydraulic integrity of the clip-to-strand joint. Accordingly, there is a long felt need for a corrosion-resistant clip-to-strand braze joint. The benefits of crevice corrosion-resistant braze joint are expected to include improved generator availability and generator reliability.

U.S. Pat. No. 5,796,189 discloses an arrangement where all of the strands are cut to the same length and the copper-phosphorous (BCuP) braze alloy is pre-placed flush to the ends of the strands. A braze alloy anti-wetting agent is used on the ends of the hollow strands to prevent plugging of the hollow strands and an inert purge gas is used during the brazing cycle. Use of the anti-wetting agent, although effective for preventing hollow strand plugging, can result in strand faying surface contamination and a poor effective braze joint length.

U.S. Pat. No. 6,784,573 teaches the use of extended hollow strands in combination with the use of a de-oxidizing gas as the purge gas. The extended hollow strands eliminate the need to use an anti-wetting agent on the ends of the hollow strands and the de-oxidizing purge gas limits oxidation during the brazing cycle, de-oxidizes strand surfaces and the braze alloy prior to alloy melting, and improves braze alloy wetting and flow. However, this practice continues the use of a phosphorous-containing braze alloy and, therefore, the potential for crevice corrosion still exists, although it is greatly minimized due to the significant reduction, or the elimination in most cases, of surface initiation sites.

A recent and commonly owned patent application Ser. No. 10/841,964, filed May 10, 2004, teaches a brazed joint between an armature bar strand package and an end fitting including: a plurality of strands arranged in a tiered array and forming the strand package; a cavity in the end fitting, free ends of the plurality of strands extending through the opening and received in the cavity; and an essentially phosphorous-free copper-silver braze alloy joining the free ends of the plurality of strands to each other and to interior surfaces of the end fitting.

A recent and commonly owned patent application Ser. No. 10/991,371, filed Nov. 19, 2004 teaches a brazed joint between an armature winding bar strand package and a hydraulic header clip end fitting including: a plurality of solid strands and a plurality of hollow strands arranged in a tiered array and forming the strand package, the plurality of hollow strands having free ends that extend axially beyond corresponding free ends of solid strands; a cavity in the end fitting into which the free ends of the hollow strands and solid strands extend, and an essentially phosphorous-free silver braze alloy joining the free ends of the plurality of hollow strands and said corresponding free ends of solid strands to each other and to interior surfaces of the end fitting, wherein said braze alloy forms an isolation layer over the free ends of the solid strands.

BRIEF DESCRIPTION OF THE INVENTION

A liquid-cooled generator stator bar end fitting, or clip, is provided that ensures sufficient filler metal braze alloy is available to bond and seal the movable copper plate cover to the clip, thereby to produce a water-tight clip to strand braze joint assembly.

The invention may be embodied in a liquid-cooled armature bar end fitting-to-strand brazed connection, comprising: an end fitting including a main body and a cover, the end fitting having a stepped interior defining a cavity at least one receptacle portion extending from said cavity to an exterior of the end fitting, a peripheral side wall of said receptacle portion being defined in part by said cover, a bottom wall of said cavity being defined at least in part by said cover; an armature winding bar strand package including a plurality of solid strands and a plurality of hollow strands arranged in a tiered array, said plurality of hollow strands having free ends that extend axially beyond corresponding free ends of said solid strands; said strands disposed in said receptacle portion so that at least said free ends of said plurality of hollow strands extend from the receptacle portion, beyond said bottom wall, into said cavity; a peripheral side wall of said cavity being laterally spaced from said hollow strands; a braze alloy joining said free ends of said plurality of hollow strands and said corresponding free ends of said plurality of solid strands to each other and to interior surfaces of said end fitting, wherein said braze alloy comprises an isolation layer over the free ends of said solid strands and laterally over said bottom wall of said cavity to a depth above a horizontal junction between said main body and said cover.

The invention may also be embodied in a brazed joint between an armature bar and a hydraulic header clip comprising: a cavity in the header clip, accessed by an opening, said header clip including a main body and a cover, a bottom wall of said cavity being defined in part by said cover; an array of solid and hollow strands received in said opening and arranged in a tiered array; a braze alloy joining said solid and hollow strands to each other and to internal surfaces of said end fitting, said braze alloy covering free ends of said solid strands and said bottom wall of said cavity to a depth above a horizontal junction between said main body and said cover and leaving free ends of said hollow strands open and unobstructed.

The invention may further be embodied in a method of forming a brazed joint between an armature bar and a hydraulic header clip end fitting, comprising: a) locating ends of a plurality of hollow strands and a plurality of solid strands within a cavity in an end fitting including a main body and a cover part such that free ends of said hollow strands extend axially beyond free ends of said solid strands and axially beyond a bottom surface of said cavity, said cover part defining at least a part of said cavity bottom surface; b) pre-placing a braze alloy around and between said ends of said hollow strands and said solid strands such that said braze alloy extends axially beyond the free ends of said solid strands; c) displacing said cover relative to said main body while heating said end fitting and said strands disposed therein to liquefy and flow said braze alloy and press said strands together, an inner peripheral wall of said cavity being spaced from said strands by said solid strands and by said bottom wall and said braze alloy flowing to cover free ends of said solid strands and said bottom wall of said cavity to a depth above a horizontal junction between said main body and said cover; and d) allowing said strands and end fitting to cool, thereby to join the free ends of the plurality of hollow strands and said corresponding free ends of solid strands to each other and to interior surfaces of the end fitting.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
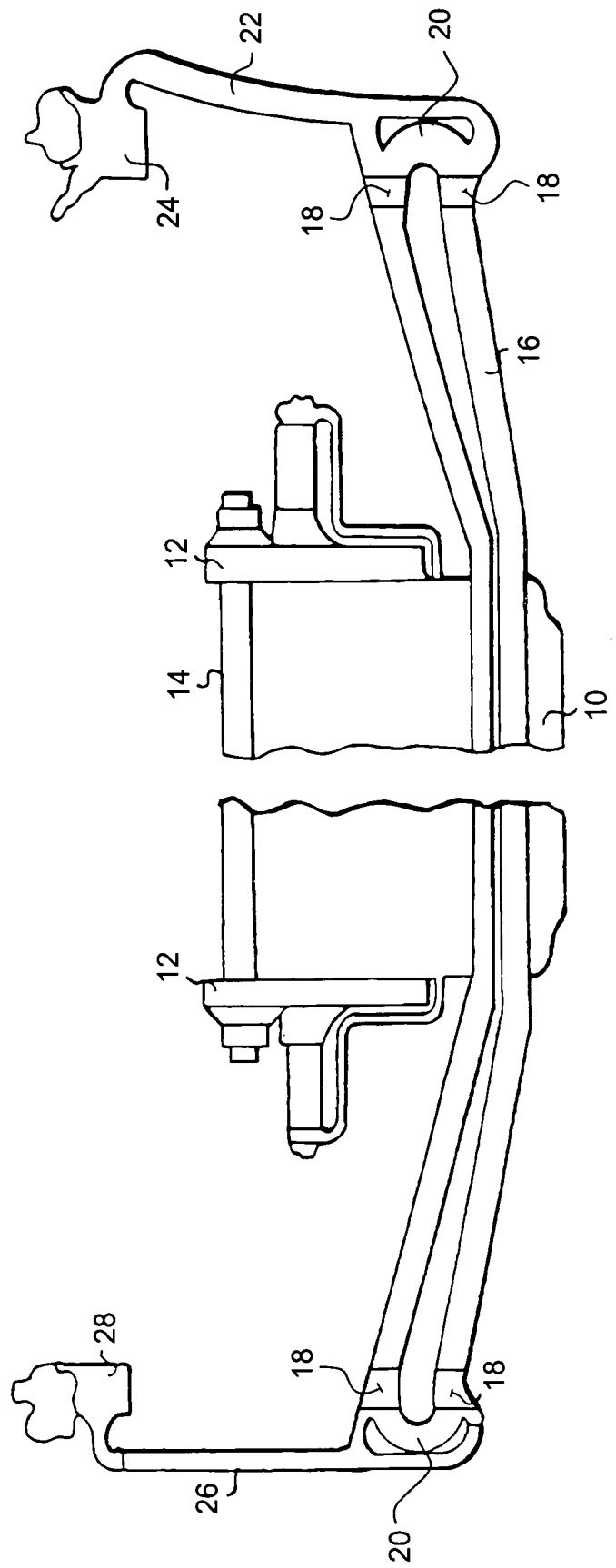
FIG. 1 is a schematic illustration of a liquid-cooled stator winding arrangement illustrating the armature bars and hydraulic header clips coupled to inlet and outlet coolant headers.

FIG. 1 illustrates a liquid-cooled armature winding arrangement for a stator in a typical liquid-cooled generator including a stator core 10 having stator core flanges 12 and core ribs 14. Armature winding bars 16 (also referred to as stator bars) pass through radially extending slots in the stator core and are capped at opposite ends by hydraulic header clips 18 fitted to the ends of the bars. Inlet hose(s) 22 connect an inlet clips 18 to an inlet coolant header 24. Outlet hose(s) 26 connect outlet clips 18 to an outlet coolant header 28. Copper or stainless steel fittings 20 connect adjacent pairs of armature bars and clips to form complete armature coil elements.

The original clip design used with the prior art disclosed by the '189 patent employed a movable copper plate, referred to as a cover. The brazing process joined a copper clip, cover and stator bar strand package comprised of square and rectangular, solid and hollow copper strands with the axis of the strand package in a horizontal orientation. The cover to clip faying surfaces were principally bonded through the use of manual feeding of filler metal with a stick form of the filler media in addition to filler metal that flows from liquefied pre-placed filler metal sheets.

U.S. Pat. No. 6,784,573, the disclosure of which is incorporated herein by reference, discloses a modification of the original clip design wherein the free ends of the hollow strands extend axially beyond the free ends of the said strands. When the '573 patent design is used with the brazing process disclosed in the '964 application, with the strand package in a vertical orientation, the top of the cover is located above the filler metal source or alloy puddle formed by the liquefied pre-placed filler metal sheets. Stick feeding of the filler metal is not possible because the braze joint assembly is enclosed in a chamber for brazing and there are no provisions for inserting the stick form of the alloy into the chamber for safety and process-control reasons. On the top of the cover located above the alloy puddle, the cover to clip faying surfaces may not completely bond due to insufficient capillary flow of the filler metal, filler metal starvation, filer metal shrinkage, filler metal outgassing, non-optimum faying surface clearances, alloy run out or poor cleanliness. In many cases, these braze joint defects result in failure of a braze joint gas leakage test and scrapping of the stator bar.

Figure 2:
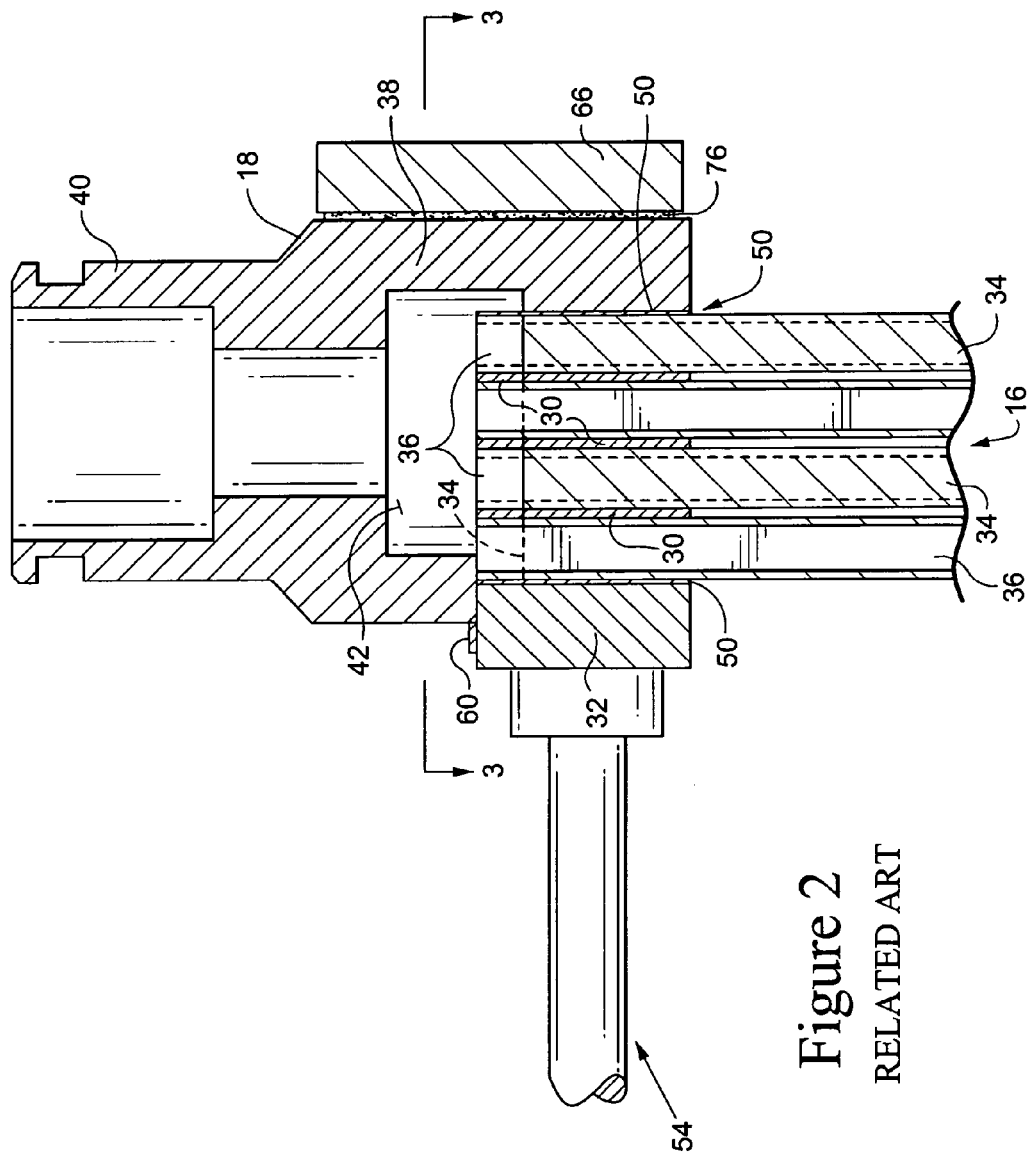
FIG. 2 is a side view of the armature winding bar, end fitting, cover and ram according to a related art.
Figure 3:
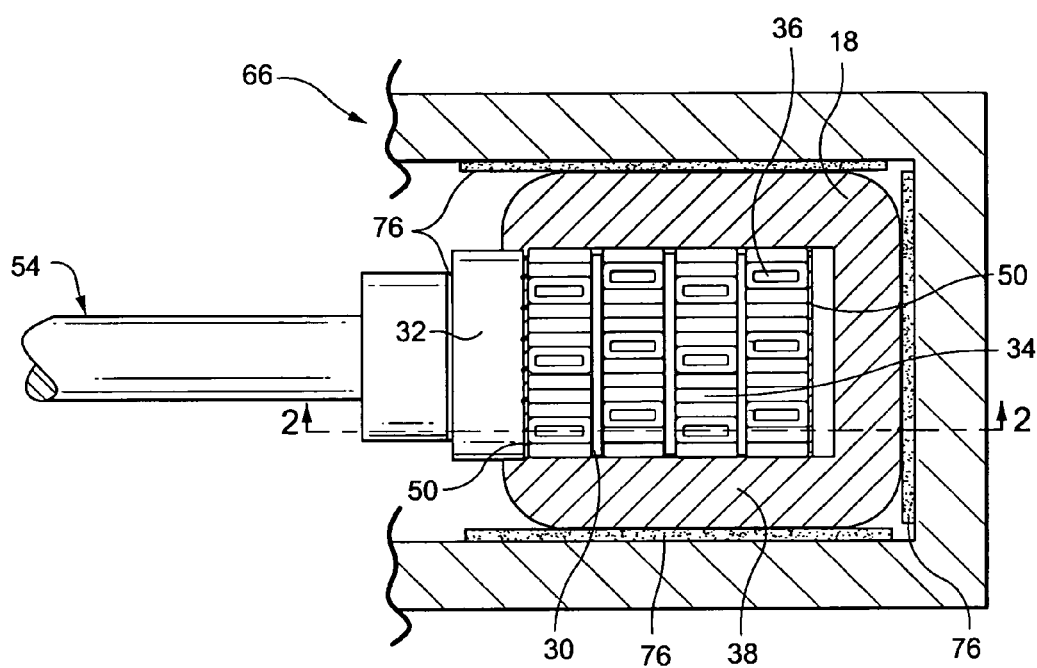
FIG. 3 is a view taken along line 3-3 of FIG. 2.
Figure 4:
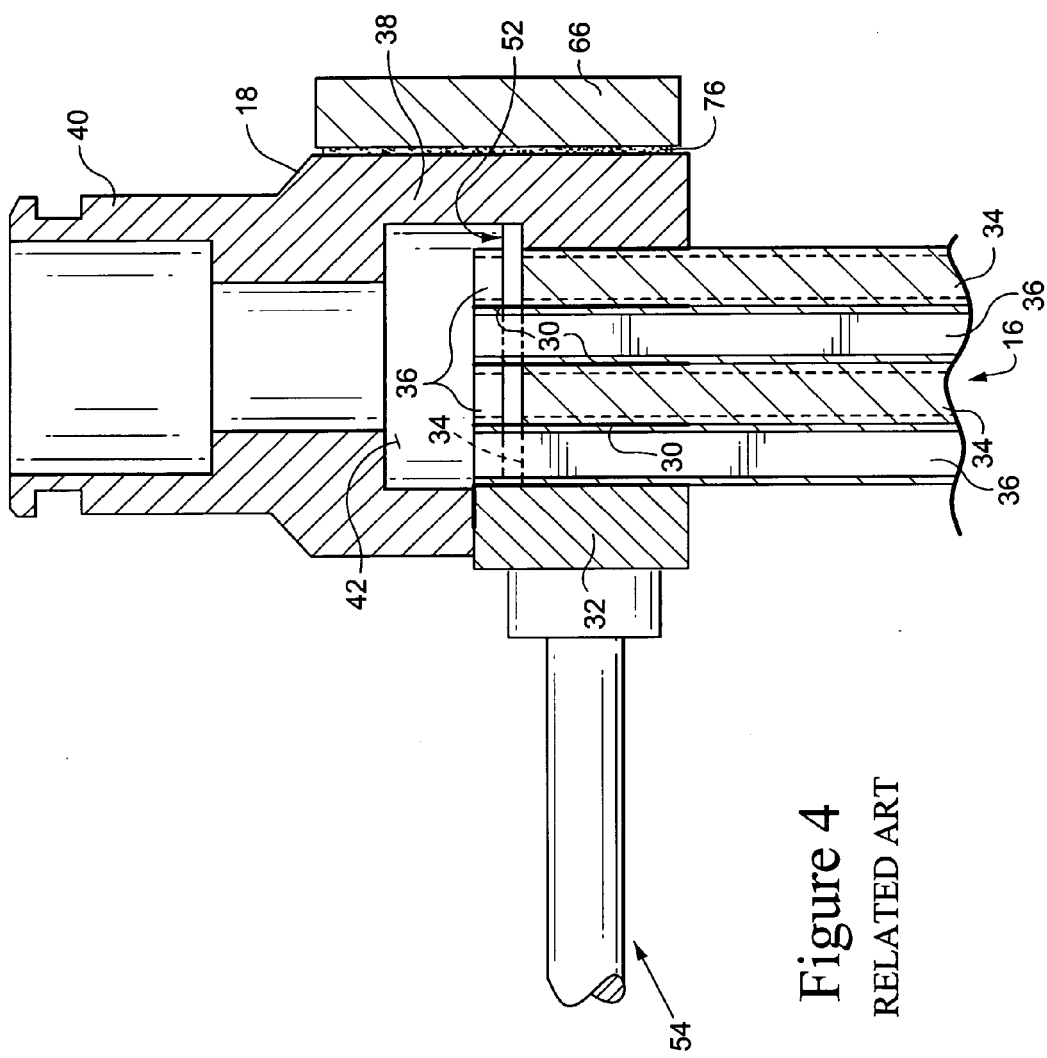
FIG. 4 is a view of the armature winding bar and end clip of FIG. 2 after the brazing process has been completed.

FIGS. 2-4 illustrate a configuration as for example in the '573 patent, but in the vertical orientation disclosed in application Ser. No. 10/841,964. Each armature winding bar is a rectangular array of solid 34 and hollow 36 copper strands. The strands 34, 36 may also be constructed of metals other than copper, such as copper-nickel alloys or stainless steel. The ends of the strands 34, 36 form the end of the armature winding bar 16. The free ends of the hollow strands 36 extend axially beyond the free ends of short solid strands 34. For example, the free ends of the hollow strands extend approximately 0.31 inch (10 to 500 mils) beyond the free ends of the solid strands.

In the armature winding bar 16 shown in FIGS. 2 and 3, the extended hollow strands 36 form tiered rows with respect to the shorter rows of solid strands 34. A four-tier array is shown in FIG. 2. It will be appreciated that various numbers of tiers are possible in an armature bar. The particular configuration of solid strands 34 and hollow strands 36 within the armature winding bar 16 is a matter of design choice. There may be a one to one ratio of solid to hollow strands or a ratio of 6 solid strands to one hollow strand. The ratio may be greater or smaller depending on the capability of the bar design to remove heat during generator operation.

Braze alloy strips 30 and sheets 50 of a rolled, essentially phosphorous-free, silver based braze alloy are placed between the tiers of strands and between the strands and the internal surfaces of the hydraulic header clip 18. The silver braze alloy of the strips 30 and sheets 50 may contain other elements, such as tin, zinc or nickel, that can result in solids and liquids modifications to suit specific applications. The thickness of the alloy strips 30 and sheets 50 is a matter of design choice. For example, the strip 30 thickness may be about 0.060 inches and the sheet 50 thickness may be about 0.020 inches. The pre-braze positioned braze alloy strips extend beyond the ends of the short solid strands.

The strips 30 inserted between the tiers of strands may be rectangular as shown in FIG. 3. The braze strips are shaped to fit between the strand rows. The edges of the braze strips may be trimmed into alignment with the outer surfaces of the strands of the bar 16. Substantially square braze sheets 50 may be fitted between the sides of the armature winding bar and the internal sides of the header clip. The height of the alloy pre-positioned before brazing is selected so that the braze alloy will entirely melt during the braze process and not flow into the open ends of the extended hollow strands.

The braze alloy has minimal phosphorous. The phosphorous-containing metallurgical phases of earlier braze alloys are susceptible to crevice corrosion. Braze alloys with less than 500 ppm (or 0.05 weight percent) phosphorous are considered phosphorous-free. The benefits of using a phosphorous free braze alloy include reduced corrosion and hence improved generator availability and reliability.

FIG. 3 is a cross-sectional end view of the hydraulic header clip 18, the free ends of the solid 34 and hollow 36 strands, the ram 54 for pressing the clip cover 32 into the clip slot during brazing and an induction heating coil 66 to heat the assembly of the clip, strand and braze strips 30 and sheets 50. Mica spacers 76 separate the coil from the clip and the ram 54 from the clip cover. The mica spacer between the coil and clip may be 0.060 inches and the spacer between the ram and clip cover may be 0.030 inches. The hydraulic header clip 18 (also referred to as a stator bar clip or end fitting) is formed of an electrically conductive material, such as copper. Each hydraulic header clip 18 includes an internal manifold chamber 42 within the clip main body 38. The manifold chamber 42 receives the strand ends 34, 36 of the armature bar and provides a conduit for coolant flowing through the clip 18 to enter or be discharged from the hollow strands 36 of the armature bar 16. The clip cover 32 fits into the matching rectangular slot in the side of the collar 38. At the other end of the clip 18 is a cylindrical coupling end 40 that is configured to connect to the coolant circuit. The external and internal shapes of a clip may vary to suit different armature bar configurations that are present in large liquid cooled turbine generators.

At the end of the brazing process, a braze alloy isolation layer 52 (FIG. 4) extends axially along and between all sides of each of the strands 34, 36 in the array, and also covers the ends (or faying surfaces) of the solid strands 34 while leaving the ends of the hollow strands 36 open and unobstructed for free flow of coolant through the hollow strands. The isolation layer shields the solid strand ends and the joints from the coolant passage in the clip. The braze alloy also bonds the clip to the strands and the strand ends to each other.

Figure 5:
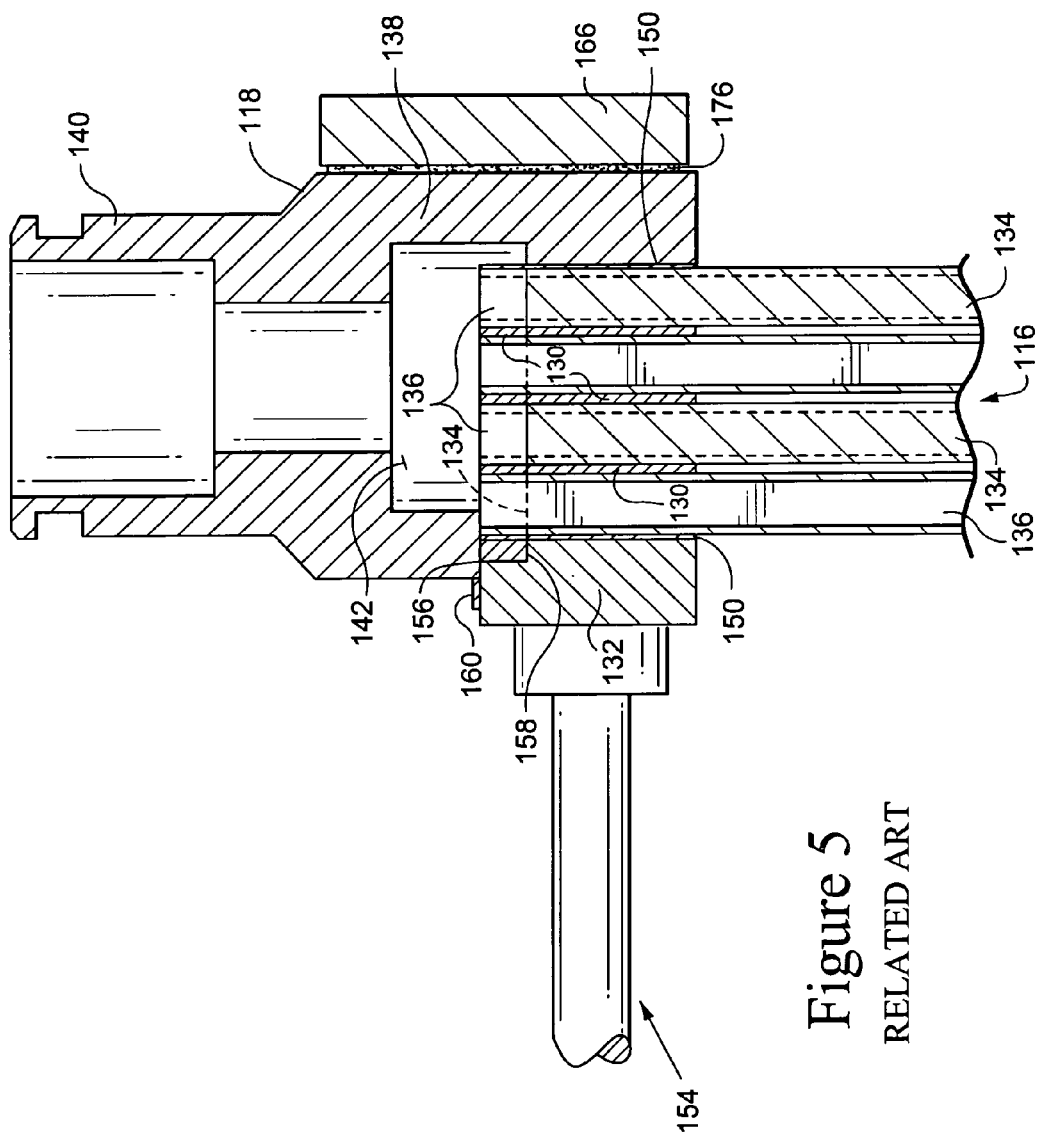
FIG. 5 is a view similar to FIG. 2 showing another related art.
Figure 6:
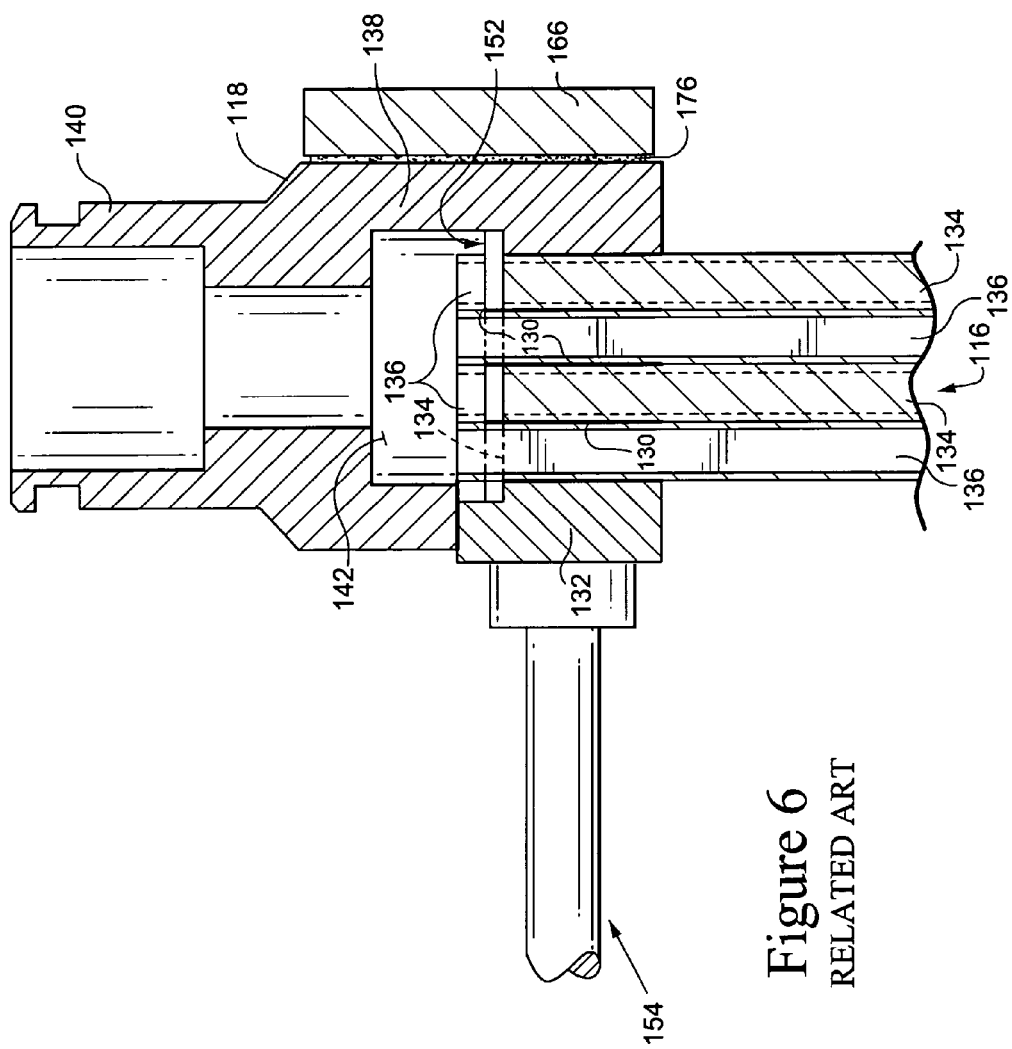
FIG. 6 is a view of the FIG. 5 configuration after brazing.

FIG. 5 schematically depicts a clip-to-strand connection structure as disclosed in copending application Ser. No. 10/991,371, wherein the cover has been notched at 156 and pre-placed braze alloy 158 is seated in the notch to provide a more effective braze alloy barrier coat or isolation layer. The structure depicted in FIGS. 5 and 6 otherwise generally corresponds to the structure depicted in and described with reference to FIGS. 2-4. Accordingly, like reference numbers, but incremented by 100, are used to label the corresponding parts in FIGS. 5-6 but the description of those components will not be repeated here.

In both the structures of FIGS. 2-4 and FIGS. 5-6, bonding and sealing of the cover is achieved by an external band of braze alloy disposed on the cover to melt to seal the cover to the clip. When the top of the cover 32,132 is located above the alloy puddle, the cover-to-clip faying surfaces may not completely bond due to insufficient capillary flow of the filler metal 60,160, filler metal starvation, filler metal shrinkage, filler metal outgassing, non-optimum faying surface clearances, alloy runout or poor cleanliness. In many cases, these braze joint defects result in failure of a braze joint gas leakage test and scrapping of the stator bar.

Figure 7:
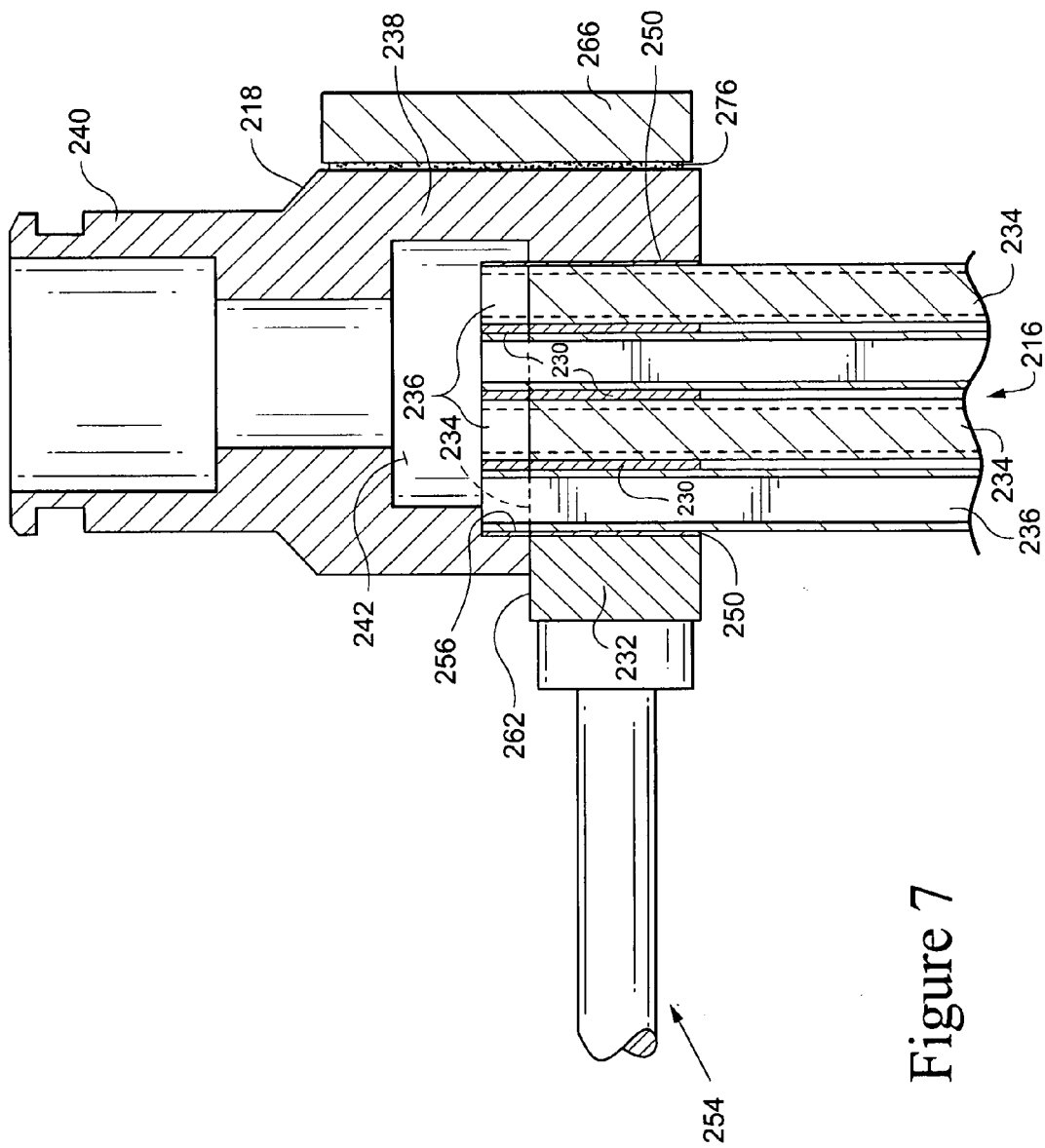
FIG. 7 is a side view of the armature winding bar, end fitting, shortened cover and ram according to an example embodiment of the invention.
Figure 8:
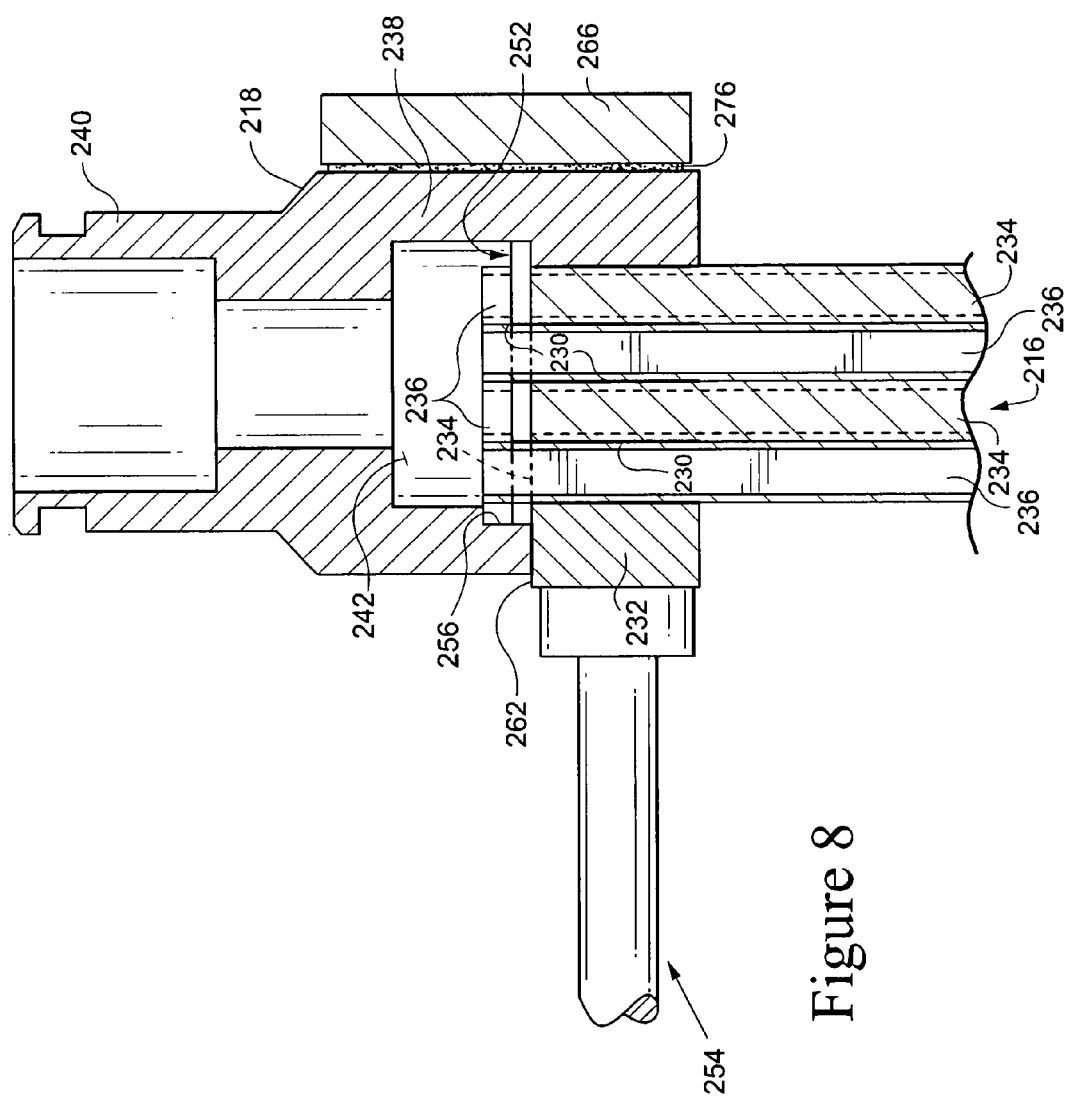
FIG. 8 is a view of the FIG. 7 configuration after brazing.

Referring to FIGS. 7-8, in an example embodiment of the invention, rather than notching 156 the cover 132 to accommodate a braze alloy barrier coat, a shorter cover 232 is used having a top end surface 262 substantially corresponding to a level of the solid strands 234 and wherein, e.g., a notch 256 is defined in the clip main body to extend substantially from where the main body 238 engages the end surface 262 of the cover 232 at least to an axial level substantially corresponding to that of the ends of the hollow strands 236, thereby defining a receptacle, once the cover 232 is displaced by the ram 254 (FIG. 8) for braze alloy barrier coat 252 to overlie at least the portion of the end surface 262 of the cover 232 exposed in the chamber 242. The clip-to-strand connection otherwise corresponds to the structures described above and, therefore, the corresponding components have been labeled with similar references, incremented further by 100, but will not be described again here except as necessary or desirable to highlight the unique structural characteristics embodying the invention.

As will be appreciated, the end fitting or clip and cover assembly of the invention, as illustrated by way of example in FIGS. 7 and 8, meets all the electrical and mechanical requirements for satisfactory-long term performance as a water-tight hydraulic fitting for the end of a liquid-cooled stator bar. The clip design meets the minimum wall thickness requirements to accommodate armature winding electrical current. The clip 218 is mechanically configured to accommodate both the clip to strand braze joint assembly prior to brazing (FIG. 7) and the brazed joint assembly upon completion of the brazing process used to join the clip to the stator bar strand package (FIG. 8). The clip design is compatible with existing brazing methods that result in compression of the strand package and closure (sealing) of the clip such that the clip-to-strand braze joint assembly will be hydraulically water-tight for the life of the generator stator winding. In an example embodiment, the clip design allows for the strand package to be inserted the same distance into the clip as the prior art design, by virtue of the height of notch 256, but incorporates a shorter cover 232. This results in a braze alloy puddle 252 that forms during brazing in a vertical orientation to cover the top of the movable copper plate (cover) 232 ensuring that there is sufficient source of braze alloy to fill and seal the joints between the cover and the clip.

The invention advantageously eliminates the need to preplace an alloy sheet around the cover, or to modify the existing brazing chamber to enable the manual stock-feeding of alloy during the brazing process.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A liquid-cooled armature bar end fitting-to-strand brazed connection, comprising:
    an end fitting including a main body and a cover, the end fitting having a stepped interior defining a cavity and at least a first receptacle portion extending from said cavity to an exterior of the end fitting, a peripheral side wall of said first receptacle portion being defined in part by said cover, a bottom wall of said cavity being defined at least in part by said cover;
    an armature winding bar strand package including a plurality of solid strands and a plurality of hollow strands arranged in a tiered array, said plurality of hollow strands having free ends that extend axially beyond corresponding free ends of said solid strands; said strands disposed in said first receptacle portion so that at least said free ends of said plurality of hollow strands extend from the receptacle portion, beyond said bottom wall, into said cavity;
    a peripheral side wall of said cavity being laterally spaced from said hollow strands;
    a braze alloy joining said free ends of said plurality of hollow strands and said corresponding free ends of said plurality of solid strands to each other and to interior surfaces of said end fitting,
    wherein said braze alloy comprises an isolation layer over the free ends of said solid strands and laterally over said bottom wall of said cavity to a depth above a horizontal junction between said main body and said cover.

2. The brazed connection of claim 1 wherein said braze alloy is an essentially phosphorous-free silver braze alloy.

3. The brazed connection of claim 1 wherein said braze alloy covers said free ends of said solid strands to a depth of at least about 0.010 inch.

4. The brazed connection of claim 1 wherein said plurality of hollow strands extend through the braze alloy isolation layer.

5. The brazed connection of claim 1 wherein said horizontal junction is in a plane of said bottom surface.

6. The brazed connection of claim 1 wherein said plurality of solid and hollow strands are composed of at least one of copper, copper-nickel alloys and stainless steel.

7. A brazed joint between an armature bar and a hydraulic header clip comprising:
    a cavity in the header clip, accessed by an opening, said header clip including a main body and a cover, a bottom wall of said cavity being defined in part by said cover;
    an array of solid and hollow strands received in said opening and arranged in a tiered array;
    a braze alloy joining said solid and hollow strands to each other and to internal surfaces of said end fitting, said braze alloy covering free ends of said solid strands and said bottom wall of said cavity to a depth above a horizontal junction between said main body and said cover and leaving free ends of said hollow strands open and unobstructed.

8. The brazed joint of claim 7 wherein said braze alloy is an essentially phosphorous-free silver braze alloy.

9. The brazed joint of claim 7 wherein said braze alloy covers said free ends of said solid strands to a depth of at least about 0.010 inch.

10. The brazed joint of claim 7 wherein said plurality of solid and hollow strands are composed of at least one of copper, copper-nickel alloys and stainless steel.

11. The brazed joint of claim 1 wherein said horizontal junction is in a plane of said bottom surface.

* * * * *